Patented Dec. 21, 1937

2,102,642

UNITED STATES PATENT OFFICE 2,102,642

TREATMENT OF MILK PRODUCTS

Herbert E. Otting, Westerville, and Edwin H. Browne and Maurice E. Hull, Columbus, Ohio, assignors to M. & R. Dietetic Laboratories, Inc., a corporation of Ohio No Drawing. Application November 25, 1935, Serial No. 51,468

29 Claims. (Cl. 99—60)

This invention relates to a method for the treatment of milk and milk products and more particularly to a method for altering or reducing the calcium and phosphate ion proportions of the treated milk products and to secure other improvements therein from a dietary standpoint. This application is related to improvements upon the subject matter of the copending application of two of us, Serial No. 650,886, filed January 9, 1933.

It has been shown in the patent to John F. Lyman No. 1,954,769, granted April 10, 1934, that the removal of calcium and phosphate ions from liquid milk products can be effected by means of materials designated as base exchange silicates under certain conditions, such as the pH control of the products under treatment, and a proper control of the composition and activity of the exchange material. In a prior application to one of us, Serial No. 560,242, filed August 29, 1931, an improvement in the known process is described in that a properly activated, absorptive silica gel is used as the base exchange material.

In the following description of the present invention, the active materials of the applications hereinbefore referred to, and which, under the conditions set forth, are capable of removing both phosphate and calcium ions from liquid milk products, are designated as exchange silicates or exchange materials. The prior application Serial No. 650,886 is directed to improvements in these methods and provides means for more effectively removing the calcium and phosphate ions to provide a liquid milk product having an improved balance of the remaining constituents and at the same time for improving the activity of the base exchange material for removal of calcium and phosphate ions and for prolonging the effective life of the base exchange material.

During the continued use of a given batch of exchange material, there is a tendency both toward structural deterioration of the exchange material and towards decrease in its effectiveness, particularly for phosphate removal. The deterioration of the material may become apparent as a softening, disintegration or breakdown of its texture or as an increase in size of particles thereof apparently due to encrustations, or to a certain extent a combination of these effects.

In the removal of the calcium and phosphate ions from the milk product it is desirable that the calcium and phosphate ions be removed in controlled relative proportions to secure a product which will not form a hard curd and which will maintain a proper relationship of calcium and phosphate ions for dietetic purposes. At the same time it is desirable that the relationship of the sodium and potassium ions in the treated milk be controlled.

By the process of the present invention we are enabled to secure the desired calcium and phosphate removal, to maintain the desired balance of salts in the treated product and to maintain the structural characteristics and exchange efficiencies of the exchange materials employed.

In the following description of the present invention, the active materials capable of removing calcium and phosphate ions from liquid milk products are referred to as base exchange materials as in our prior application. These materials may be natural or artificial zeolitic materials such as zeolites or glauconites which are sold in the trade and commonly known as "Permutit", "Refinite", "Crystallite" and the like. As set forth in the prior application to one of us hereinbefore referred to, silica gel may be used as the exchange material if activated according to our invention.

In accordance with the present invention, the active exchange material is washed with water until the latter is clear in order to remove any excess alkali and other water soluble compounds present in the exchange material. As the first use of the exchange material is likely to impart an undesirable flavor to the milk to be treated, we accordingly first run a milk product (preferably skim milk) therethrough. The exchange material is then regenerated or revivified to activate it for use and is ready for use for the treatment of the liquid milk or liquid milk products. Similar regeneration and activation of the exchange material is effected after each use, which charges the spent material with adsorbed phosphate and calcium ions.

The spent exchange material is washed preliminarily with water, preferably upflow, to remove in part the milk fat, proteins and other organic and soluble matter left in it after use. Warm water is preferably employed for this wash, at a temperature suitably of 100°–105° F. although temperatures up to 110° F. may be used. When the exchange material is clean, washing is discontinued, the water drained therefrom and the material is ready for the regenerating treatment, the first step of which is an alkali wash.

In the first alkali wash we employ a modified alkali solution, of an alkalinity such as to show a slight residual alkalinity at the end of the washing operation. We may employ an aqueous solution of a caustic alkali such as sodium hydroxide in which is incorporated a water-soluble silicate such as sodium meta-silicate. The solution may contain from 3 to 20 parts per 1000 of sodium hydroxide and 2 to 15 parts per 1000 of soluble sodium meta-silicate. A suitable solution contains about three-fourths of a pound of sodium hydroxide and one-half pound of sodium meta-silicate to 20 gallons of water, which is sufficient for use with each cubic foot of exchange material (about 45 lbs. dry weight). The amount employed should be sufficient to keep the exchange material covered in the washing operation. The above solution is recirculated through the washed, spent exchange material in the filter for a sufficient period of time, about ten minutes, preferably upflow and with occasional stirring. The alkali solution is used preferably warm, suitably at from 80° to 100° F. At the end of the wash period the solution should show a slight alkalinity; say equivalent to an $$\frac{N}{10} \text{ to } \frac{N}{20}$$

alkali solution. The solution is then withdrawn from the filter, the exchange material is washed with warm water as before and the material then treated with a salt solution as hereinafter described. Obviously, the amounts of the ingredients of the solution can be varied to treat any desired amounts of spent exchange material at any desired alkalinity.

In the first alkali wash described above the water-soluble silicate serves to maintain the structural characteristics of the exchange material and its presence appears to improve the activity of the exchange material for removal of phosphate ions in the subsequent use of the regenerated and activated material. The silicate also apparently serves to stabilize the alkalinity of the solution due to its inherent buffering characteristics. The amount of silicate used can obviously vary within rather wide limits. In the case of exchange material having an alumino-silicate structure, it is desirable that the sodium silicate bear a desired relation or ratio to a compound (sodium aluminate) used in a subsequent stage of our process for a purpose to be described.

The alkali wash is followed by a treatment with a salt solution. As indicated in the prior applications above referred to, the salt solution employed may be the usual alkali metal salt or salts used in revivifying spent exchange materials, as for instance the alkali metal halides or chlorides. We have found that the continued use of a salt of a single alkali metal in the revivifying salt bath ultimately tends to cause disturbances in the alkali metal salt relationships of the milk subjected to treatment. We therefore prefer to use both sodium and potassium salts in the salt bath in varying amounts controlled to secure a desired relationship of these salts in the treated milk. The relative proportions of the two salts in the revivifying solution may be varied somewhat, particularly if it is found that the desired balance of sodium and potassium salts in the liquid milk product undergoing treatment is being disturbed; and in the event that a decrease in either the sodium or potassium content of the product is taking place, a corresponding increase in the relative proportion of the salt of the same alkali metal may be made in the solution employed for revivification.

For example, the salt mixture can be made up of 3 to 4 parts of sodium chloride to 1 part of potassium chloride. The concentration of salts may vary from 5% to 10%. We have found that 40 gallons of a 5 to 8% solution of the mixed salts will adequately restore the capacity of removing calcium ions to each cubic foot of spent exchange material, and maintain the desired alkali salts relation in milk treated therewith. However, the amount of solution used is dependent in part upon the depth of the bed of exchange material treated and hence in some instances a lesser amount of salt solution can be used to accomplish the same result.

The first alkali wash apparently tends to leave some complex calcium compounds in a form such that they are not broken up by the salt solution and hence not all of the adsorbed calcium is removed. To assist the salt solution in removing all the calcium ions from the spent exchange material, an acid is employed which breaks up the calcium complexes formed. The acid used may be any innocuous acid such as glacial acetic acid, buffered with sodium acetate or other suitable alkali metal salt of a weak acid, the acid being used in amounts sufficient to neutralize the alkali in the spent exchange material. From 200 to 500 cc. of glacial acetic acid and from 1 to 2 pounds of sodium acetate is found suitable for each cubic foot of exchange material in the salt solution. In general, about 5 oz. of sodium acetate is sufficient to buffer 100 cc. of acetic acid at the desired pH in the solution, which is suitably of about $$\frac{N}{10}$$

acidity.

The acidified salt solution is now percolated downwards through the spent exchange material until the effluent is substantially free from calcium ions, as indicated by no more than a faint cloudiness when a small sample is tested with ammonium oxalate. It is sometimes found desirable to add all of the acid and buffer salt to one-half of the salt solution, this half being percolated through the bed of exchange material first and followed by the remainder. When all of the calcium ions have been removed, the bed of exchange material is then washed with about 7 to 10 gallons of water per cubic foot of exchange material. This wash water is preferably forced downwardly through the bed to push the salt solution from the exchange material. In localities where the water is hard (15 grains or more of $CaCO_3$ per gallon), excess washing of the exchange material should be avoided as the exchange material would pick up calcium ions from the water. We have found that the life of the exchange material is prolonged where water of practically zero hardness or zeolite treated water is used as the wash. It is believed that the formation of insoluble compounds in the exchange material during the reviving and washing procedures may be avoided.

The acid in the salt solution removes some alkali from the exchange material and this must now be restored. To accomplish this, we utilize a second alkali wash which restores the desired alkalinity of the exchange material and also improves the effectiveness of the exchange material for removal of phosphate ions. The proportion of the alkali in the solution is substantially the same as in the first alkali solution or wash. The second alkali wash preferably includes a water-soluble aluminate when the exchange material is zeolitic or an alumino-silicate and this wash serves to restore the alumina lost by the exchange material during revivification and to improve the effectiveness of the exchange material. The amount of sodium aluminate used is substantially the same as of the sodium meta-silicate in the first alkali wash and a like amount of sodium hydroxide is used as in the first wash.

The second alkali wash is circulated in the same manner and proportions as the first, and at about the same temperature. The solution should show a slight residual alkalinity, say $$\frac{N}{30} \text{ to } \frac{N}{50}$$

after washing is completed. The sodium aluminate may be used in the first alkali wash in lieu of the sodium meta-silicate and the latter may be used in the second alkali wash; however, we prefer to use the sodium aluminate in the second alkali wash. As stated above, a proper relation should be maintained between the silicate and the aluminate in order to insure the maintenance of silica and alumina relationship in the alumino-silicate exchange material. In this manner the continued effectiveness of the exchange material for the removal of calcium and phosphorous ions is maintained. The sodium aluminate may be used in the form of a solution having a 32% concentration and known in the trade as "Nalco #2". When the exchange material is an activated silica gel the aluminate may be employed in the solution, serving as a buffer; or other suitable alkali metal salt of a weak acid may be used, as sodium borate, sodium acetate, sodium silicate or the like.

Following the second alkali wash, the now revivified exchange material is washed as before and is cooled by the use of cool wash water. It is now ready to be contacted with the liquid milk product to be treated. As set forth in the above-mentioned copending applications, the milk must be in an acid condition during the contact operation in order to secure effective removal of the phosphate and calcium ions.

The milk to be treated by our activated exchange material is first cooled, say to about 50° F. or lower, and then acidified by a hydroxylated food acid, preferably citric acid. The preliminary cooling of the milk prevents curdling thereof by the inclusion of the acid, although care should be exercised in introducing the acid into the milk in order to prevent local curdling. The action of the exchange material in removing phosphate ions reduces the acidity of the milk and hence acidification is necessary prior to treatment with the exchange material both to restore the original acidity of the milk and to facilitate the removal of the calcium and phosphate ions. Sufficient hydroxylated food acid is therefore added to the milk to give an acidity of 0.25%–0.35% (calculated as lactic acid). We prefer to employ citric acid as by means of this acid the desired acidity may be secured without deleteriously effecting the milk and the character of the final product is improved from the standpoint of the alkaline ash secured. The acidified milk is then raised to a temperature (about 64° F.) at which ionization of the calcium and phosphorous takes place and is subjected to treatment with the activated exchange material as set forth in the prior named applications. The treated milk is now found to have an acidity of 0.14%–0.17% (calculated as lactic acid). We have found that about one cubic foot of exchange material, activated as heretofore set forth, will effectively remove the calcium and phosphorus ions from about 100 gallons of milk and at the same time maintain the desired alkali metal relationship in the treated milk.

The milk treated as above described is found to have reduced calcium and phosphate ion proportions and will not curdle with rennin even when employing 10 drops of concentrated rennin extract to 10 cc. of treated milk product. It likewise will not form a curd with pepsin.

When the exchange material is used for some time, usually about a month or two, it is found that it becomes somewhat soft-textured due to the continued action of the alkali thereon. The efficiency of the exchange material, in this condition, decreases and hence its effectiveness in removing calcium and phosphate is seriously impaired. We have found that the effectiveness of the exchange material can be restored by a novel hardening treatment which compacts the texture of the exchange material and hence makes it suitable for use for protracted periods.

In carrying out this novel step of our regeneration process it is essential that the exchange material be substantially free from calcium ions. Hence, this treatment should be employed subsequent to the use of the acidified salt solution described above and prior to the second alkali wash. As will be hereinafter set forth, the second alkali wash is dispensed with when the hardening treatment is employed. To accomplish the hardening treatment, a fairly strong solution of sodium silicate in water is formed, say 1 part in 9 of water, and this is heated nearly to boiling temperature. This sodium silicate solution is circulated through the acidified salt treated exchange material for about 1 hour while maintaining the silicate solution at or near its boiling temperature. About 25 to 30 gallons of sodium silicate solution per cubic foot of exchange material is sufficient to compact the texture of a soft-textured exchange material. After the exchange material has been treated for the requisite time, the silicate solution is drained off and the treated exchange material is washed with warm water.

When the hardening process is employed the second alkali wash may be dispensed with and in lieu thereof a sodium aluminate wash is utilized. This aluminate wash is used without added alkali and the soluble aluminate is present in an amount about four times as great as in the second alkali wash above described; that is, from 1.5 to 2.5 pounds of sodium aluminate in twenty gallons. The hardening treatment may be followed by the hereinbefore described second alkali wash although the results appear to be better when only the aluminate solution is used. After the aluminate treatment, the hardened reactivated exchange material is ready for the further treatment of milk.

When the base exchange material has been once treated with milk great care is necessary to avoid bacterial growth in it, particularly in the periods between use. We accordingly subject the spent exchange material to the action of a dilute solution of formaldehyde, preferably after the first alkali wash or after completion of the revivication. The exchange material is cooled, suitably by washing with water, and a dilute solution of formaldehyde, containing say 1 to 5 parts formaldehyde per thousand, is then circulated through the exchange material. This effectively prevents the growth of bacteria and renders the exchange material substantially sterile. When the exchange material is to be used again for the treatment of milk or milk products, the formaldehyde is thoroughly washed from the exchange material and, if revivication has not been completed, it is proceeded with from the point at which the formaldehyde solution was added as hereinbefore described.

We have found that the condition of the active exchange material, as determined by the revivifying and regenerating treatment above described, is closely related to the effects secured on treatment of the liquid milk product with the exchange material. Thus, by operating in accordance with the present invention, we are enabled to secure an adequate removal of calcium and phosphate ions in a single passage of the liquid milk product through a bed or contact mass of the exchange material. Furthermore, we are enabled to control the character of the constituents retained in the milk, preserving a better balance of the sodium and potassium salts, and in general securing a more dependable operation and an improved treated product.

The liquid milk product undergoing treatment may be whole milk, skim milk, or other liquid milk products, such as buttermilk, whey, or the like. It will be readily apparent that the present invention may be employed in reducing the calcium and phosphate content of aqueous solutions generally by contacting them with reactivated exchange material as in the treatment of liquid milk products. After treatment of the aqueous solutions, the spent exchange material may be revivified as described above.

Although the present invention has been described in connection with specific details of various operations in which it is carried out, it is to be understood that it is not limited thereto, except in so far as included in the accompanying claims.

We claim:

1. The method of effecting the partial removal of calcium and phosphate ions from acidified liquid milk products by contact with a reactivated spent exchange material which comprises separately treating the spent exchange material carrying calcium and phosphate ions with solutions of a water soluble silicate and of a water soluble aluminate, and with an intervening alkali metal salt solution, and subsequently contacting the activated material with the acidified milk product.

2. The method of effecting the partial removal of calcium and phosphate ions from acidified liquid milk products by contact with a reactivated spent exchange material which comprises separately treating the spent exchange material carrying calcium and phosphate ions with solutions of an alkali containing a water soluble silicate and of an alkali containing a water soluble aluminate and with an intervening alkali metal salt solution, and subsequently contacting the activated material with the acidified milk product.

3. The method of effecting the partial removal of calcium and phosphate ions from acidified liquid milk products by contact with a reactivated spent exchange material which comprises separately treating the spent exchange material carrying calcium and phosphate ions with solutions of an alkali containing a water soluble silicate and of an alkali containing a water soluble aluminate and with an intervening solution of sodium and potassium chloride, and subsequently contacting the activated material with the acidified milk product.

4. The method of effecting the partial removal of calcium and phosphate ions from acidified liquid milk products by contact with a reactivated spent exchange material which comprises successively treating the spent exchange material carrying calcium and phosphate ions with a solution of a water-soluble silicate, with an alkali metal salt solution, and with a solution of a water soluble aluminate, and subsequently contacting the activated material with the acidified milk product.

5. The method of effecting the partial removal of calcium and phosphate ions from acidified liquid milk products by contact with a reactivated spent exchange material which comprises successively treating the spent exchange material carrying calcium and phosphate ions with an aqueous solution of alkali containing a silicate, with an alkali metal salt solution, and with an aqueous solution of an alkali containing an aluminate, and subsequently contacting the activated material with the acidified milk products.

6. The method of effecting the partial removal of calcium and phosphate ions from acidified liquid milk products and at the same time maintaining a desired alkali metal salt balance therein by contact with a reactivated spent exchange material which comprises successively treating the spent exchange material carrying calcium and phosphate ions with an aqueous solution of alkali containing a silicate, with a solution of sodium chloride and potassium chloride, and with an alkali containing an aluminate, and subsequently contacting the activated material with the acidified milk products.

7. The method of effecting the partial removal of calcium and phosphate ions from acidified liquid milk products and at the same time maintaining a desired alkali metal salt balance therein by contact with a reactivated spent exchange material which comprises successively treating the spent exchange material carrying calcium and phosphate ions with an aqueous solution of alkali containing sodium silicate, with an aqueous solution containing sodium chloride and a lesser amount of potassium chloride, and with an aqueous solution of an alkali containing sodium aluminate, and subsequently contacting the activated material with the acidified milk.

8. The method of effecting the partial removal of calcium and phosphate ions from acidified milk products by contact with a reactivated spent exchange material which comprises successively treating the spent exchange material carrying calcium and phosphate ions with a solution of an alkali containing a water-soluble aluminate, with an alkali metal salt solution and with a solution of an alkali containing a water-soluble silicate, and subsequently contacting the activated material with the acidified milk product.

9. The method of effecting the partial removal of calcium and phosphate ions from acidified milk products by contact with a reactivated spent exchange material which comprises successively treating the spent exchange material carrying calcium and phosphate ions with a solution of an alkali containing a water-soluble aluminate, with a solution containing sodium chloride and potassium chloride and with a solution of alkali containing a water-soluble silicate, and subsequently contacting the activated material with the acidified milk products.

10. The method of effecting the partial removal of calcium and phosphate ions from acidified milk products by contact with a reactivated spent exchange material which comprises successively treating the spent exchange material carrying calcium and phosphate ions with a solution of a sodium hydroxide containing sodium aluminate, with a solution containing sodium chloride and potassium chloride and with a solution of sodium hydroxide containing sodium meta-silicate, and subsequently contacting the activated material with the acidified milk products.

11. In the method of effecting the partial removal of calcium and phosphate ions from acidified milk products by contact with a reactivated spent exchange material, the step comprising treating exchange material carrying calcium and phosphate ions with an aqueous solution of a water-soluble silicate.

12. In the method of effecting the partial removal of calcium and phosphate ions from acidified milk products by contact with a reactivated spent exchange material, the steps comprising treating exchange material carrying calcium and phosphate ions with aqueous solutions of sodium silicate and of a water-soluble aluminate.

13. In the method of effecting the partial removal of calcium and phosphate ions from acidified milk products by contact with a reactivated spent exchange material, the steps comprising treating exchange material carrying calcium and phosphate ions with a solution of sodium silicate and subsequently with an aqueous solution of sodium aluminate.

14. In the method of effecting the partial removal of calcium and phosphate ions from acidified liquid milk products by contact with a reactivated spent exchange material, the steps comprising successively treating the spent exchange material carrying calcium and phosphate ions with a water-soluble silicate, with an alkali metal salt solution and with a second silicate solution.

15. In the method of effecting the partial removal of calcium and phosphate ions from acidified liquid milk products by contact with a reactivated spent exchange material, the steps comprising successively treating the spent exchange material carrying calcium and phosphate ions with a water-soluble silicate, with an alkali metal salt solution, with a second silicate solution and subsequently with an aluminate solution.

16. In the method of effecting the partial removal of calcium and phosphate ions from acidified liquid milk products by contact with a reactivated spent exchange material, the steps comprising successively treating the spent exchange material carrying calcium and phosphate ions with an aqueous solution of an alkali and sodium silicate, with an alkali metal salt solution, with sodium silicate and subsequently with sodium aluminate.

17. In the method of effecting the partial removal of calcium and phosphate ions from acidified liquid milk products by contact with a reactivated spent exchange material, the steps comprising successively treating the spent exchange material carrying calcium and phosphate ions with an aqueous solution of an alkali and sodium silicate, with a solution of sodium chloride and potassium chloride, with a solution of sodium silicate and subsequently with sodium aluminate.

18. The method of effecting the partial removal of calcium and phosphate ions from acidified aqueous solutions containing such ions by contact with a reactivated spent exchange material which comprises treating the spent exchange material carrying calcium and phosphate ions with solutions of a water-soluble silicate and a water-soluble aluminate and with an intervening alkali metal salt solution, and subsequently contacting the activated material with the acidified aqueous solution.

19. The method of effecting the partial removal of calcium and phosphate ions from acidified aqueous solutions containing such ions by contact with a reactivated spent exchange material which comprises separately treating the spent exchange material carrying calcium and phosphate ions with solutions of an alkali and a water-soluble silicate and an alkali and a water-soluble aluminate and with an intervening alkali metal salt solution and subsequently contacting the activated material with the acidified aqueous solution.

20. The method of effecting the partial removal of calcium and phosphate ions from acidified aqueous solutions by contact with a reactivated spent exchange material which comprises separately treating the spent exchange material carrying calcium and phosphate ions with solutions of an alkali and a water-soluble silicate and an alkali and a water-soluble aluminate and with an intervening aqueous solution of sodium chloride and potassium chloride and subsequently contacting the activated material with the acidified aqueous solution.

21. The method of effecting the partial removal of calcium and phosphate ions from acidified aqueous solutions by contact with a reactivated spent exchange material which comprises successively treating the spent exchange material carrying calcium and phosphate ions with an aqueous solution of an alkali and a silicate, with an alkali metal salt solution and with an aqueous solution of an alkali and an aluminate and subsequently contacting the activated material with the acidified aqueous solution.

22. The method of effecting the partial removal of calcium and phosphate ions from acidified aqueous solutions by contact with a reactivated spent exchange material which comprises successively treating the spent exchange material carrying calcium and phosphate ions with an aqueous solution of an alkali and an aluminate, with an alkali metal salt solution and with an aqueous solution of an alkali and a silicate and subsequently contacting the activated material with the acidified aqueous solution.

23. The method of effecting the partial removal of calcium and phosphate ions from acidified liquid milk products by contact with a reactivated spent exchange material which comprises separately treating the spent exchange material carrying calcium and phosphate ions with solutions of a water soluble silicate and of a water soluble aluminate, and with an intervening acidified alkali metal salt solution, and substantially contacting the activated material with the acidified milk product.

24. The method of effecting the partial removal of calcium and phosphate ions from acidified liquid milk products by contact with a reactivated spent exchange material which comprises separately treating the spent exchange material carrying calcium and phosphate ions with solutions of an alkali containing a water soluble silicate and of an alkali containing a water soluble aluminate and with an intervening acidified alkali metal salt solution, and subsequently contacting the activated material with the acidified milk product.

25. The method of effecting the partial removal of calcium and phosphate ions from acidified liquid milk products by contact with a reactivated spent exchange material which comprises separately treating the spent exchange material carrying calcium and phosphate ions with solutions of an alkali containing a water soluble silicate and of an alkali containing a water soluble aluminate and with an intervening acidified solution of sodium and potassium chloride, and subsequently contacting the activated material with the acidified milk product.

26. The method of effecting the partial removal of calcium and phosphate ions from acidified liquid milk products by contact with a reactivated spent exchange material which comprises successively treating the spent exchange material carrying calcium and phosphate ions with an aqueous solution of alkali containing a silicate, with an acidified alkali metal salt solution, and with an aqueous solution of an alkali containing an aluminate, and subsequently contacting the activated material with the acidified milk product.

27. In the method of effecting the partial removal of calcium and phosphate ions from acidified liquid milk products by contact with a reactivated spent exchange material, the steps comprising successively treating the spent exchange material carrying calcium and phosphate ions with a water-soluble aluminate, with an alkali metal salt solution and with a second aluminate treatment.

28. The method of effecting the partial removal of calcium and phosphate ions from acidified milk products by contact with a reactivated spent exchange material which comprises successively treating the spent exchange material carrying calcium and phosphate ions with a solution of an alkali containing a water soluble aluminate, with an alkali metal salt solution and with a solution of an alkali containing a water-soluble aluminate, and subsequently contacting the activated material with the acidified milk product.

29. The method of effecting the partial removal of calcium and phosphate ions from acidified aqueous solutions containing such ions by contact with a reactivated spent exchange material which comprises treating the spent exchange material carrying calcium and phosphate ions with solutions of a water-soluble silicate and a water-soluble aluminate and with an intervening acidified alkali metal salt solution, and subsequently contacting the activated material with the acidified aqueous solution.

HERBERT E. OTTING.
EDWIN H. BROWNE.
MAURICE E. HULL.